United States Patent Office 2,914,470
Patented Nov. 24, 1959

2,914,470

HYDROREFINING OF PETROLEUM

Herbert L. Johnson, Media, Henry E. Reif, Drexel Hill, and Abraham Schneider, Overbrook Hills, Pa., assignors to Sun Oil Company, Philadelphia, Pa., a corporation of New Jersey No Drawing. Application December 5, 1955
Serial No. 550,842

6 Claims. (Cl. 208—264)

This invention relates to the hydrorefining of petroleum, and more particularly to a manner of carrying out such hydrorefining whereby improved results are obtained with regard to product quality, catalyst life, etc.

It is known in the art to hydrorefine petroleum by contacting crude petroleum or fractions thereof with hydrorefining catalyst in the presence of hydrogen. Such processes may be carried out for the purpose of desulfurization, improvement for use as cracking charge, conversion of unstable materials in the charge, etc. It is generally desirable in such hydrorefining operations that the extent of decomposition of hydrocarbon constituents of the charge into lower molecular weight materials be minimized, and in this respect hydrorefining processes are sharply distinguished from processes of destructive hydrogenation, wherein a primary purpose is the formation of lower molecular weight materials such as gasoline, etc.

In hydrorefining processes employing solid catalysts, it is often found that the catalyst life is unsatisfactorily short, so that frequent regeneration is necessary, and such frequent regeneration constitutes a disadvantage of prior art hydrorefining processes. The short life of the catalyst is attributable to the deposition of various contaminating materials on the catalyst, with consequent decline in catalytic activity. This decline in activity not only makes the life of the catalyst undesirably short, but also results in poorer product quality during the hydrorefining operation.

According to the present invention, a novel manner of hydrorefining is provided wherein the catalyst activity is maintained at a substantially higher level of activity than that obtainable according to prior art processes, and wherein a longer catalyst life is provided, thus permitting operation with less frequent regeneration of the catalyst.

The process according to the invention involves contacting petroleum with a hydrorefining catalyst under hydrorefining conditions in the presence of specified amounts of hydrogen sulfide, the amount of hydrogen sulfide in the hydrorefining zone being maintained substantially constant by periodic or continuous measurement of the amount of hydrogen sulfide and regulation thereof in accordance with the results of the measurement. It has been found that the amount of hydrogen sulfide should be at least above a certain minimum if optimum results with regard to catalyst activity and life are to be obtained. It has also been found that the relative amount of hydrogen sulfide should be below a certain level, if optimum results are to be obtained. The optimum amount depends on various factors, including nature of charge stock, severity of operating conditions, etc.

The amount of hydrogen sulfide present in the gases in hydrorefining zone in operation according to the invention should be within the approximate range from 1 to 10 volume percent, and preferably within the approximate range from 3 to 6 volume percent. For any one hydrorefining system, the amount of hydrogen sulfide should not only be within the specified range, but also should be maintained substantially constant by measurement and adjustment of the amount. However the particular amount varies depending upon the system, though generally being within the specified range.

In preferred operation according to the invention, the charge to the hydrorefining operation is contacted with hydrorefining catalyst by passing the charge continuously through a bed of solid hydrorefining catalyst; the effluent from the catalyst bed, together with excess hydrogen and other materials such as hydrogen sulfide formed during the hydrorefining operation, is then introduced into a separator, from which normally gaseous materials are withdrawn separately from the normally liquid hydrorefining products, these gaseous materials then being recycled to the hydrorefining zone. In such operation, the amount of hydrogen sulfide in the recycled gases varies according to the amount of sulfur compounds initially contained in the hydrorefining charge and on the extent of conversion of those sulfur compounds into hydrogen sulfide during the hydrorefining operation. In some instances, the amount of hydrogen sulfide in the recycled gases will be approximately the correct amount for optimum hydrorefining conditions, and it will be necessary merely to add hydrogen sulfide occasionally, or to remove part of the hydrogen sulfide occasionally, in order to compensate for deviations from the proper amount of hydrogen sulfide.

However, in most instances, the amount of hydrogen sulfide produced as a result of the conversion of sulfur compounds in the charge will not be the proper amount for optimum hydrorefining conditions, and it will be necessary to regularly add hydrogen sulfide to the recycled gases, or to regularly remove a portion of the hydrogen sulfide from the recycled gases. Many of the hydrorefining charges which will be treated according to the invention will not contain sufficient sulfur compounds to produce the proper amount of hydrogen sulfide in the recycle gases, and addition of hydrogen sulfide to the recycle gases will be required.

The hydrorefining conditions which are employed according to the invention are those which produce less than 10 weight percent, and more preferably less than 5 weight percent, of hydrocarbon constituents boiling below 400° F. Where the charge stock contains no hydrocarbon constituents boiling below 400° F., the product obtained according to the invention contains less than 10 weight percent of such constituents. Where the charge stock contains some amount of such low-boiling constituents, the difference between the charge and product contents of such constituents is less than 10 weight percent. Where the charge stock contains more than 90 percent of such constituents, the difference between the charge and product contents of such constituents will of course be less than 10 weight percent in any case, and the hydrorefining conditions will be chosen according to known principles for selection of hydrorefining conditions for such lighter fractions.

The process of the present invention is applicable to crude petroleum and its fractions generally, including such various types of fractions as lubricating oil, gas oil, kerosene, gasoline, wax, etc. The conditions of the hydrorefining operation will depend upon the nature of the charge, and it is generally well known in the art what conditions are suitable for the various types of charge stocks which are hydrorefined. In the case of crude petroleum or reduced crude, for example, temperatures within the approximate range from 600° F. to 825° F., and more preferably within the range from 700° F. to 800° F. are generally suitable. With such charges, pressures within the approximate range from 150 p.s.i.g. to 3000 p.s.i.g., and more preferably within the range from 300 p.s.i.g. to 2000 p.s.i.g. are generally suitable, For charge stocks having lower average molecular weight, generally the temperatures employed in the hydrorefining will be lower than those required in the hydrorefining of crude petroleum or reduced crude, and may for example be as low as 300° F. in the case of a gasoline charge stock.

Where the hydrorefining charge is passed through a bed of hydrorefining catalyst, the space rate is preferably within the approximate range from 0.5 to 5 volumes of charge per volume of catalyst bed per hour. In such operation, the rate of recycling of gases to the hydrorefining zone is preferably within the approximate range from 500 to 5000 standard cubic feet per barrel. The amount of hydrogen in the recycle gases is preferably within the approximate range from 70 to 95 mole percent.

Any suitable hydrorefining catalyst can be employed according to the invention. Examples of suitable hydrorefining catalyst are the various known metallic hydrogenation catalysts such as copper, zinc, magnesium, tin, vanadium, tungsten, chromium, molybdenum, manganese, cobalt, iron, nickel, etc., or their oxides or sulfides or mixtures of such metals, oxides or sulfides, or combinations thereof such as cobalt molybdate. Any suitable catalyst base or support can be employed in conjunction with the hydrorefining catalyst, such as bauxite, alumina, clay, kieselguhr, pumice, silica gel, silica-alumina compositions, magnesia, activated carbon, charcoal, etc. Any of the well known methods for preparing hydrorefining catalysts can be employed.

Preferred catalysts for use according to the invention are those containing an element from group 6 of the Periodic Table, and more preferably molybdenum in particular. The preferred catalysts provide particularly beneficial results in conjunction with the maintenance of the prescribed amounts of hydrogen sulfide in the hydrorefining zone, in that particularly good hydrorefining action is obtained with minimization of undesirable decomposition reactions.

The conditions which are employed in the hydrorefining operation according to the invention are preferably selected in such a manner as to provide an increase, if any, in the A.P.I. gravity (determined for the material boiling above 400° F. vapor temperature) which is not substantially greater than 10 units, and preferably not substantially greater than 7.5 units. These limitations on the increase of A.P.I. gravity indicate that the extent of formation of lower molecular weight constituents is not permitted to exceed certain limits. It is also preferred that the product of the hydrorefining operation contain not substantially more than 50 percent of constituents which boil below the 5 percent point of the hydrorefining charge.

The amount of hydrogen sulfide present in the hydrorefining operation according to the invention is preferably within the approximate range from 100 to 1000 standard cubic feet per barrel of charge, and more preferably within the approximate range from 150 to 400 standard cubic feet per barrel.

The following example illustrates the invention:

A 10 percent residue from Texas and Louisiana crudes was hydrorefined at a temperature of 800° F. and a pressure of 1500 p.s.i.g. by percolation through a bed of solid hydrogenation catalyst comprising 12.5 percent cobalt molybdate coprecipitated with alumina. The space rate was one volume of charge per volume of catalyst bed per hour, the hydrogen to oil mole ratio was about 25, and the product gases were recycled to the hydrorefining zone at a rate of 4000 standard cubic feet per barrel of charge; hydrogen sulfide was added to the recycle gases in amount such that those gases contained 6 mole percent of hydrogen sulfide and 88 mole percent of hydrogen, the amount of hydrogen sulfide thus being 240 standard cubic feet per barrel of charge. Make-up hydrogen was supplied to replace used hydrogen and maintain the desired pressure.

For purposes of comparison, a separate experiment was performed on the same charge stock using the same catalyst, and the conditions being the same as those given above, except that hydrogen sulfide was not added to the recycle gases prior to re-introduction into the hydrorefining zone, and consequently the recycle gases contained only one mole percent of hydrogen sulfide.

The following table shows the results, product A being the product obtained according to the invention, with 6% $H_2S$ in the recycle gases, and product B being the product obtained without addition of $H_2S$ to the recycle gases, the latter containing only one percent $H_2S$.

| | Charge | Product A | Product B |
|---|---|---|---|
| API Gravity, 60° F. | 11.4 | 17.3 | 16.5 |
| Ramsbottom Carbon Res., Weight percent | 13.6 | 9.0 | 10.8 |
| O.D. Color | 94,400 | 59,400 | 67,000 |
| Refractive Index, 20° C. | 1.5730 | 1.5470 | 1.5560 |
| Viscosity, SUS at 210° F. | 3,958 | 209 | 267 |
| Asphaltenes, Wt. Percent | 11.1 | 7.0 | 8.4 |
| H/C Atomic Ratio | 1.53 | 1.60 | 1.57 |
| Sulfur, Wt. Percent | 1.28 | 0.49 | 0.66 |
| Nitrogen, Wt. Percent | 0.58 | 0.47 | 0.52 |
| Nickel, p.p.m. | 59 | 24 | 33 |
| Vanadium, p.p.m. | 119 | 34 | 58 |
| Sulfur Removed, Wt. Percent | | 62 | 48 |
| Nitrogen Removed, Wt. Percent | | 19 | 11 |
| Hydrogen Consumed, s.c.f./bbl. Charge | | 520 | 360 |
| Product Distribution, Wt. Percent: | | | |
| $H_2S$ | | 1 | 1 |
| Dry Gas ($C_1$-$C_3$) | 0 | 1 | 1.5 |
| Gasoline ($C_4$—400° F.) | 0 | 2.5 | 1.5 |
| Gas Oil— | | | |
| (400-650° F.) | 0 | 8 | 7.5 |
| (650-840° F.) | 0 | 9 | 7 |
| (840-1,000° F.) | 4 | 17.5 | 15 |
| Bottoms (>1,000° F.) | 96 | 61 | 66.5 |
| Average Mol Wt. | >700 | 575 | 595 |

The product properties given in the above table, with the exception of the distillation data, were obtained after stabilizing the product at a vapor temperature of 400° F. in a slow nitrogen current.

Comparison of the operation according to the invention with the operation wherein hydrogen sulfide was not added to the recycle gases indicates that the operation according to the invention produced substantially greater reduction in Ramsbottom carbon residue, and sulfur, nitrogen asphaltenes and metals content while producing only slightly greater conversion of constituents to lower molecular weight materials.

The following table shows a further comparison of the results:

| | Invention (A) | Comparison (B) |
|---|---|---|
| Percent $H_2S$ in recycle gases | 6 | 1 |
| Reduction in Ramsbottom carbon, Wt. Percent | 4.6 | 2.8 |
| Reduction in Sulfur, Wt. Percent | 0.79 | 0.62 |
| Reduction in Nitrogen, Wt. Percent | 0.11 | 0.06 |
| Reduction in Asphaltenes, Wt. Percent | 4.1 | 2.7 |
| Products boiling below 400° F., Percent | 3.5 | 3 |

Thus, operation according to the invention makes it possible to secure superior hydrorefining activity under conditions which do not substantially increase the amount of hydrocarbon constituents boiling below 400° F. which are formed in the process. This result was unexpected in view of the prior art, which indicated that the maintenance of high hydrogen sulfide content in a hydrogenation zone increases the extent of formation of such low boiling constituents.

The invention claimed is:

1. Process for hydrorefining petroleum which comprises passing reduced crude petroleum through a bed of solid granular hydrorefining catalyst in a hydrorefining zone at a temperature within the approximate range from 600 to 825° F., pressure within the approximate range from 150 to 3000 p.s.i.g. and liquid hourly space velocity within the approximate range from 0.5 to 5 volumes of charge per volume of catalyst bed per hour; separating product gases from the hydrorefined reduced crude; recycling the product gases to the hydrorefining zone at a rate within the approximate range from 500 to 5000 standard cubic feet per barrel; maintaining the hydrogen sulfide content in the gases in the hydrorefining zone during said passing at a substantially constant level within the approximate range from 1 to 10 volume percent by measurement of the hydrogen sulfide content and adjustment thereof; thereby to produce during said passing not substantially more than 10 weight percent of hydrocarbons boiling below 400° F. and to obtain a product having hydrogen-to-carbon ratio in that portion of the product consisting of all materials boiling above 400° F., which ratio is greater than that in the charge stock and greater than that which is obtained in the absence of said adjustment.

2. Process according to claim 1 wherein the temperature is in the range from 700 to 800° F.

3. Process according to claim 1 wherein the pressure is in the range from 300 to 2000 p.s.i.g.

4. Process according to claim 1 wherein the product gases and additional hydrogen sulfide are introduced into the hydrorefining zone.

5. Process according to claim 1, wherein the catalyst comprises a group 6 metal.

6. Process according to claim 1 wherein said content is within the approximate range from 3 to 6 volume percent.

References Cited in the file of this patent

UNITED STATES PATENTS

| | | |
|---|---|---|
| 1,852,988 | Varga | Apr. 5, 1932 |
| 1,894,926 | Varga | Jan. 17, 1933 |
| 2,131,089 | Beeck et al. | Sept. 27, 1938 |
| 2,398,175 | Cole | Apr. 9, 1946 |
| 2,604,438 | Bannerot | July 22, 1952 |
| 2,623,007 | Myers | Dec. 23, 1952 |
| 2,656,302 | Porter et al. | Oct. 20, 1953 |